Figures 1, 2:
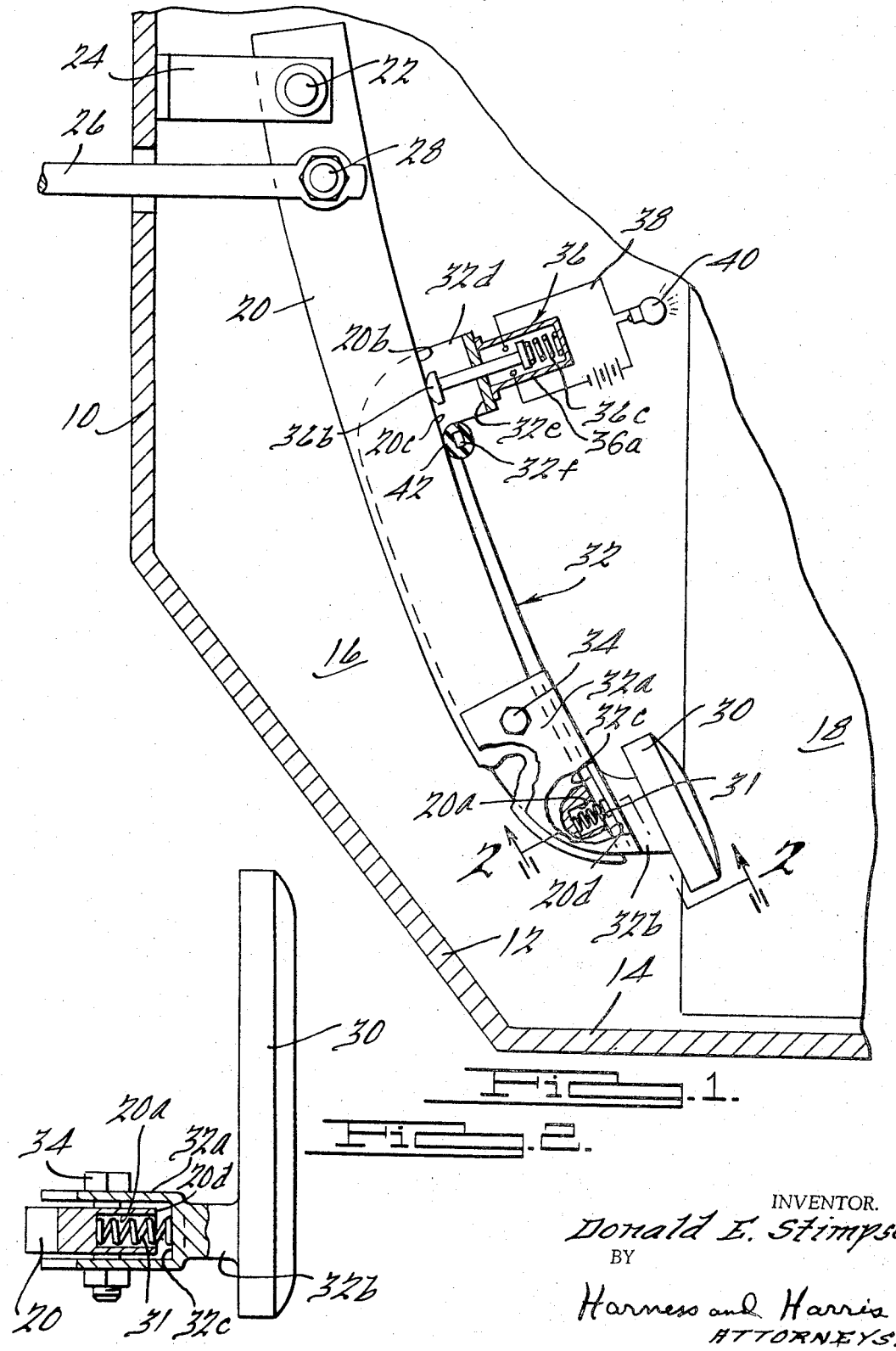

Oct. 1, 1968  D. E. STIMPSON  3,404,246

BRAKE SWITCH ASSEMBLY

Filed Sept. 1, 1966

INVENTOR.
Donald E. Stimpson
BY
Harness and Harris
ATTORNEYS.

United States Patent Office 3,404,246
Patented Oct. 1, 1968

3,404,246
BRAKE SWITCH ASSEMBLY
Donald E. Stimpson, Madison Heights, Mich., assignor to Chrysler Corporation, Highland Park, Mich., a corporation of Delaware
Filed Sept. 1, 1966, Ser. No. 576,609
7 Claims. (Cl. 200—61.89)

This invention relates to a brake light energizing system for a motor vehicle; more particularly, it relates to a brake pedal and brake light switch assembly for a motor vehicle.

It is an object of the present invention to provide an improved brake light energizing system for a motor vehicle.

Another object is to provide an improved brake pedal and brake light switch assembly for a motor vehicle.

A more specific object is to provide an improved mounting for the brake light switch of a motor vehicle.

Yet another object is to provide a brake light energizing system that is physically and functionally independent of the hydraulic braking circuit, so as not to introduce the possibility of creating a leak in that circuit, and yet is responsive to the line pressure in the braking circuit so as to actuate the brake light in accordance with the actual braking effort being applied.

In the brake light energizing system of the present invention, the brake pedal is mounted to the brake pedal arm by a yieldable connection allowing a controlled amount of relative movement therebetween and means are provided which are operative to make and break the brake light circuit in response to relative movement between the brake pedal and the brake pedal arm.

In the disclosed embodiment of the invention, the yieldable connection between the brake pedal and brake pedal arm includes a lever which is pivotally mounted intermediate its ends on the brake arm and carries the brake pedal at the lower end thereof; a brake light switch is carried by the other or upper end of the lever and this switch is actuated in response to relative movement between the upper end of the lever and the brake arm occurring in response to depression of the brake pedal by an operator of the motor vehicle. Preferably, the pivot axis of the lever is nearer its lower end than its upper end so that a relatively small amount of movement or depression of the brake pedal will produce a relatively large amount of switch actuating movement at the upper end of the lever.

These and other objects, features and advantages of the invention will be apparent from the following detailed description of a preferred embodiment of the invention and from the accompanying drawing wherein:

FIG. 1 is a fragmentary, partially schematic view of a motor vehicle embodying a brake pedal and brake light switch assembly according to the invention; and FIG. 2 is a cross sectional view taken on line 2—2 of FIG. 1.

The motor vehicle seen fragmentarily and schematically in FIG. 1 includes a dash board 10, toe board 12, floor pan 14, kick panel 16, and a door 18.

A brake pedal arm 20 is pivotally suspended at 22 as, for example, by a bracket 24 secured to dash board 10. A master cylinder piston or push rod 26 is pivotally secured at 28 to brake pedal arm 20 and extends through an aperture in dash board 10 for coaction in known manner with a master cylinder (not shown).

Pedal arm 20 supports a brake pedal 30 in position to be engaged and depressed by the foot of an operator of the motor vehicle. Pedal arm 30 is connected to pedal arm 20 by a lever 32 pivotally mounted intermediate its ends, as by a bolt 34, to pedal arm 20.

The lower end of lever 30 includes a clevis portion 32a fitting over and embracing the corresponding contoured lower end of pedal arm 20 and a pedestal portion 32b extending integrally outwardly from clevis portion 32a to rigidly mount pedal 30. A bore 20a in the upper face of the lower end of pedal arm 20 receives a coil compression spring 31 which bears continuously against the inner face 32c of the top wall of clevis portion 32a to continuously urge lever 32 for movement in a counterclockwise direction about its pivot axis.

The upper end of lever 32 is formed as a continuation of one wall of clevis portion 32a. It extends upwardly along a side face of pedal arm 20 to terminate in an outwardly extending pedestal portion 32d which is bent over to form a tab portion 32e overlying the adjacent face 20b of brake arm 20.

A brake light switch 36 is suitably secured to tab portion 32e of lever 32. Switch 36 includes a housing 36a and an actuating member 36b in the form of a plunger slidably received within housing 36a and extending through an aperture in tab portion 32e for coaction at its free end with the adjacent face 20b of the brake arm. Switch 36 further includes a coil spring 36c which continuously urges plunger 36b in a direction outwardly of housing 36a and toward brake arm surface 20b. Plunger 36b includes a bridging member which is adapted to make or break a brake light circuit 38 controlling a stop light 40. It will be understood that stop light 40 and brake light circuit 38 are shown schematically in FIG. 1; stop light 40 will normally be carried at the rear of the vehicle to provide a visible braking signal to following motorists.

Lever 32 also includes a tab portion 32f which carries a bushing 42. Bushing 42 is preferably formed of a resilient material and is adapted to coact with the adjacent surface 20c of brake arm 20 to limit relative pivotal movement of lever 32 on brake arm 20 in a counterclockwise direction. It will be noted that surface 32c on clevis portion 32a coacts with the adjacent upper face 20d of the brake arm to provide coacting stop means to limit relative pivotal movement of the lever in a clockwise direction.

Stop 42 and spring 31 normally coact to maintain lever 32 and pedal 30 in their extreme counterclockwise position relative to the brake arm. In this position, plunger 36b engages brake arm surface 20b to preclude movement of the plunger to its switch closing position. When pedal 30 is depressed, lever 32 pivots clockwise against the resistance of spring 31 to allow plunger 36b to move outwardly of housing 36a to close switch 36 and complete circuit 38 to brake light 40. Since relative movement between lever 32 and brake arm 20 against the resistance of spring 31 is determined by the line pressure in the hydraulic braking circuit as transmitted to the brake arm 20 by push rod 26, a predetermined amount of relative movement between lever 32 and arm 20 will occur upon the development of a predetermined line pressure in the braking circuit; the stop light will thus be energized in accordance with the brake line pressure rather than the brake pedal travel.

Since the pivot axis of lever 32 is considerably nearer its lower end than its upper end, a small amount of movement of brake pedal 30 produces a relatively large amount of movement of the upper end of lever 32 so that the necessary travel to actuate stop light switch 36 may be achieved with only a slight amount of lost motion between pedal 30 and brake arm 20.

It will be seen that the described system provides a brake light switch which is both functionally and physically outside of the brake line circuit, so as to preclude the possibility of creating a leak in that circuit, and yet is actuated in response to a signal which is proportional to the line pressure in the braking circuit and thereby proportional to the actual braking effort being applied.

While a preferred embodiment of the invention has been illustrated and described in detail, it is to be understood that various changes may be made in the disclosed embodiment without departing from the scope or spirit of the invention as defined by the appended claims.

I claim.

1. A brake pedal and brake assembly for a motor vehicle comprising:
   (a) a brake pedal;
   (b) a brake pedal arm entirely supporting said brake pedal in position to be engaged and depressed by the foot of an operator of said motor vehicle;
   (c) means providing a yieldable connection between said brake pedal and said pedal arm to allow a controlled amount of relative movement therebetween;
   (d) a brake switch having contacts; and
   (e) means operative to make and break said contacts in response to the aforesaid relative movement between said brake pedal and said pedal arm.

2. An assembly according to claim 1 wherein:
   (f) said yieldable connection means includes a lever pivotally mounted intermediate its ends on said brake arm and carrying said brake pedal at one end thereof; and
   (g) said operative means comprises said brake switch and said brake switch has an actuator member adapted to be moved in response to relative movement between the other end of said lever and said brake pedal arm.

3. An assembly according to claim 2 wherein:
   (h) said brake switch is carried by said other end of said lever; and
   (i) said actuator member comprises a plunger normally urged into engagement with the adjacent surface of said brake pedal arm to maintain said switch in a normally open position, whereby said plunger is urged outwardly to a switch closed position in response to movement of said other end of said lever away from said adjacent pedal arm surface.

4. An assembly according to claim 2 wherein:
   (h) the pivot axis of said lever is nearer said one end thereof than said other end thereof, whereby a relatively small amount of movement of said brake pedal relative to said pedal arm produces a relatively large amount of movement of said other end of said lever relative to said brake pedal arm.

5. An assembly according to claim 2 wherein:
   (h) first coacting stop means are provided on said lever and said arm to limit relative pivotal movement of said lever in one direction;
   (i) second coacting stop means are provided on said lever and said arm to limit relative pivotal movement of said lever in the other direction; and
   (j) said yieldable connection means further includes spring means continuously urging said lever for pivotal movement in said one direction, whereby said first stop means and said spring means normally coact to maintain said lever in its extreme pivotal position in said one direction while said spring means acts to yieldably resist pivotal movement of said lever in said other direction upon depression of said pedal and said second stop means limits such pivotal movement in said other direction.

6. An assembly according to claim 5 wherein:
   (k) the other end of said lever includes a portion disposed in adjacent but spaced relation to a surface of said pedal arm with said lever in its extreme pivotal position in said one direction,
     (1) said portion being arranged to move away from said surface in response to pivotal movement in said other direction occurring upon depression of said pedal;
   (l) said brake switch is carried by said lever portion and includes a housing;
   (m) said actuator member comprises a plunger projecting outwardly from said housing toward said surface and spring urged for axial movement in a direction outwardly of said housing to close said switch, said plunger
     (1) engaging said surface with said lever in its extreme pivotal position in said one direction to preclude movement of said plunger to its switch closing position; and
     (2) moving outwardly of said housing to its switch closing position upon movement of said lever in said other direction.

7. An assembly according to claim 6 wherein:
   (n) the pivot axis of said lever is nearer said one end thereof than said other end thereof, whereby a relatively small amount of movement of said brake pedal relative to said pedal arm produces an amount of movement of said lever portion away from said pedal surface sufficient to allow said plunger to move to its switch closing position.

References Cited
UNITED STATES PATENTS 3,219,775  11/1965  Carpenter _____ 200—61.89

ROBERT K. SCHAEFER, *Primary Examiner.*

M. GINSBURG, *Assistant Examiner.*